United States Patent
Doll et al.

(10) Patent No.: US 8,126,627 B2
(45) Date of Patent: Feb. 28, 2012

(54) CRUISE CONTROL SYSTEM HAVING VERIFICATION AND/OR NOTIFICATION FEATURES

(75) Inventors: John William Arthur Doll, Renton, WA (US); Andrew Joseph Ressa, Mount Vernon, WA (US)

(73) Assignee: PACCAR Inc, Bellevue, WA (US)

(*) Notice: Subject to any disclaimer, the term of this patent is extended or adjusted under 35 U.S.C. 154(b) by 230 days.

(21) Appl. No.: 12/014,601

(22) Filed: Jan. 15, 2008

(65) Prior Publication Data
US 2009/0178869 A1 Jul. 16, 2009

(51) Int. Cl.
*B60T 7/12* (2006.01)
*B60K 31/00* (2006.01)
*B60Q 1/00* (2006.01)

(52) U.S. Cl. ............ 701/97; 180/170; 340/438

(58) Field of Classification Search ............ 701/91, 701/93, 301, 302, 1, 200–226, 300; 180/170; 123/349
See application file for complete search history.

(56) References Cited

U.S. PATENT DOCUMENTS
| | | | |
|---|---|---|---|
| 6,362,729 B1 * | 3/2002 | Hellmann et al. | 340/436 |
| 2004/0167702 A1 * | 8/2004 | Isogai et al. | 701/96 |

* cited by examiner

*Primary Examiner* — James Trammell
*Assistant Examiner* — Muhammad Shafi
(74) *Attorney, Agent, or Firm* — Christensen O'Connor; Johnson Kindness PLLC

(57) ABSTRACT

Cruise control systems and methods suitable for use in vehicles, such as Class 8 trucks, are provided. For example, cruise control systems are disclosed that include verification and/or notification features for verifying the operational condition of the cruise control system, and if non-operational, notifies the vehicle operator of system inoperability and/or instructs the operator to activate a specified control input, e.g., press and release the clutch pedal, the service brake pedal, the parking brake, etc., so that cruise control functionality may be enabled.

11 Claims, 4 Drawing Sheets

> Press and Release ❗
>
> Brakes Before Setting Cruise

*Fig.4.*

> Press and Release ❗
>
> Clutch Before Setting Cruise

*Fig.5.*

CRUISE CONTROL SYSTEM HAVING VERIFICATION AND/OR NOTIFICATION FEATURES

FIELD OF THE INVENTION

Embodiments of the present invention relate generally to cruise control systems for motor vehicles.

BACKGROUND

Modern motor vehicles often are equipped with cruise control systems, which function to control the speed of the vehicle, thereby relieving the operator of the vehicle of a certain amount of associated effort. Typically, cruise control systems monitor select control inputs, such as the brake pedal or the clutch pedal, so that if the vehicle operator activates, e.g., depresses, the control input, the cruise control will disengage. As a result, any inappropriate subsequent control of the vehicle speed by the cruise control system is avoided.

SUMMARY

To ensure proper disengagement of the cruise control, it is desirable for cruise control systems to first require the successful completion of functionality checks of an appropriate control input monitoring system prior to enablement of cruise control functionality. In one embodiment, the control input monitoring system includes but is not limited to a service brake pressure sensor, a clutch pedal switch/sensor, a parking brake switch/sensor, etc. In addition, it is desirable to notify the vehicle operator that the cruise control system has failed one or more of these functionality checks, and as a result, has caused the cruise control system to be disabled, i.e., not available for the vehicle operator to control the speed of the vehicle.

As will be described in the detailed description, aspects of the present invention provide verification and/or notification features to the cruise control system that verify the operational status of the cruise control system and notifies the vehicle operator of such status. Further aspects of the present invention provide instructions to the vehicle operator for operator action that may regain cruise control operability.

In accordance with aspects of the present invention a method is provided for notifying a vehicle operator of the availability of using the cruise control system during vehicle operation. The method is implemented in a vehicle cruise control system having at least one functionality switch that engages the cruise control and one or more control inputs that disengages the cruise control upon activation. The method comprises testing whether the cruise control system is operational. If the cruise control system is operational, then the cruise control system is enabled. If the cruise control system is not operational, the vehicle operator is notified that the cruise control is disabled.

In accordance with another aspect of the present invention, a cruise control system for a vehicle is provided. The cruise control system includes an output device operative to transmit information to a vehicle operator, one or more control inputs, one or more signal generators capable of generating signals indicative of the actuation of one or more associated control inputs, and a controller. The controller is operative to 1) receive signals generated by the one or more signal generators; 2) store said signals generated by the one or more signal generators; 3) determine if the cruise control system is operational based on said stored signals; and 4) generate cruise control inoperability information for output by the output device for notifying the vehicle operator of cruise control inoperability.

In accordance with another aspect of the present invention, a vehicle cruise control system is provided. The cruise control system includes a display mounted in a location visible to a vehicle operator and operative to display information, one or more control input devices, a cruise control monitoring system for monitoring the activation of the one or more control input devices, and means for determining the operational condition of the control input monitoring system and for displaying a message on the display indicating cruise control inoperability.

It should be appreciated that this summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 4 is one example of a displayed message to the vehicle operator for instructing the operator to activate, e.g., press and release, the brake pedal so that cruise control functionality may be enabled; and FIG. 5 is one example of a displayed message to the vehicle operator for instructing the operator to activate, e.g., press and release, the clutch pedal so that cruise control functionality may be enabled.

DETAILED DESCRIPTION

Embodiments of the present invention will now be described with reference to the drawings where like numerals correspond to like elements. Embodiments of the present invention are generally directed to cruise control systems suitable for use in vehicles, such as Class 8 trucks. More particularly, embodiments of the present invention are directed to verification and/or notification features suitable for use with the cruise control system that verify the operational condition of the cruise control system, and if non-operational, notifies the vehicle operator of system inoperability and/or instructs the operator to activate a specified control input, e.g., press and release the clutch pedal, the service brake pedal, the parking brake, etc., so that cruise control functionality may be enabled.

Although exemplary embodiments of the present invention will be described hereinafter with reference to Class 8 trucks, it will be appreciated that aspects of the present invention have wide application, and therefore, may be suitable for use with many types of electrically power, mechanically powered or hybrid powered vehicles, such as passenger vehicles, buses, commercial vehicles, etc. Accordingly, the following descriptions and illustrations herein should be considered illustrative in nature, and thus, not limiting the scope of the present invention, as claimed.

Prior to discussing the details of various aspects of the present invention, it should be understood that the following description is presented largely in terms of logic and operations that may be performed by conventional electronic components. These electronic components, which may be grouped in a single location or distributed over a wide area, generally include processors, memory, storage devices, display devices, input devices, etc. It will be appreciated by one skilled in the art that the logic described herein may be implemented in a variety of configurations, including but not limited to, analog circuitry, digital circuitry, processing units, and the like. In circumstances were the components are distributed, the components are accessible to each other via communication links.

In the following description, numerous specific details are set forth in order to provide a thorough understanding of exemplary embodiments of the present invention. It will be apparent to one skilled in the art, however, that many embodiments of the present invention may be practiced without some or all of the specific details. In some instances, well-known process steps have not been described in detail in order not to unnecessarily obscure various aspects of the present invention.

Figure 2:
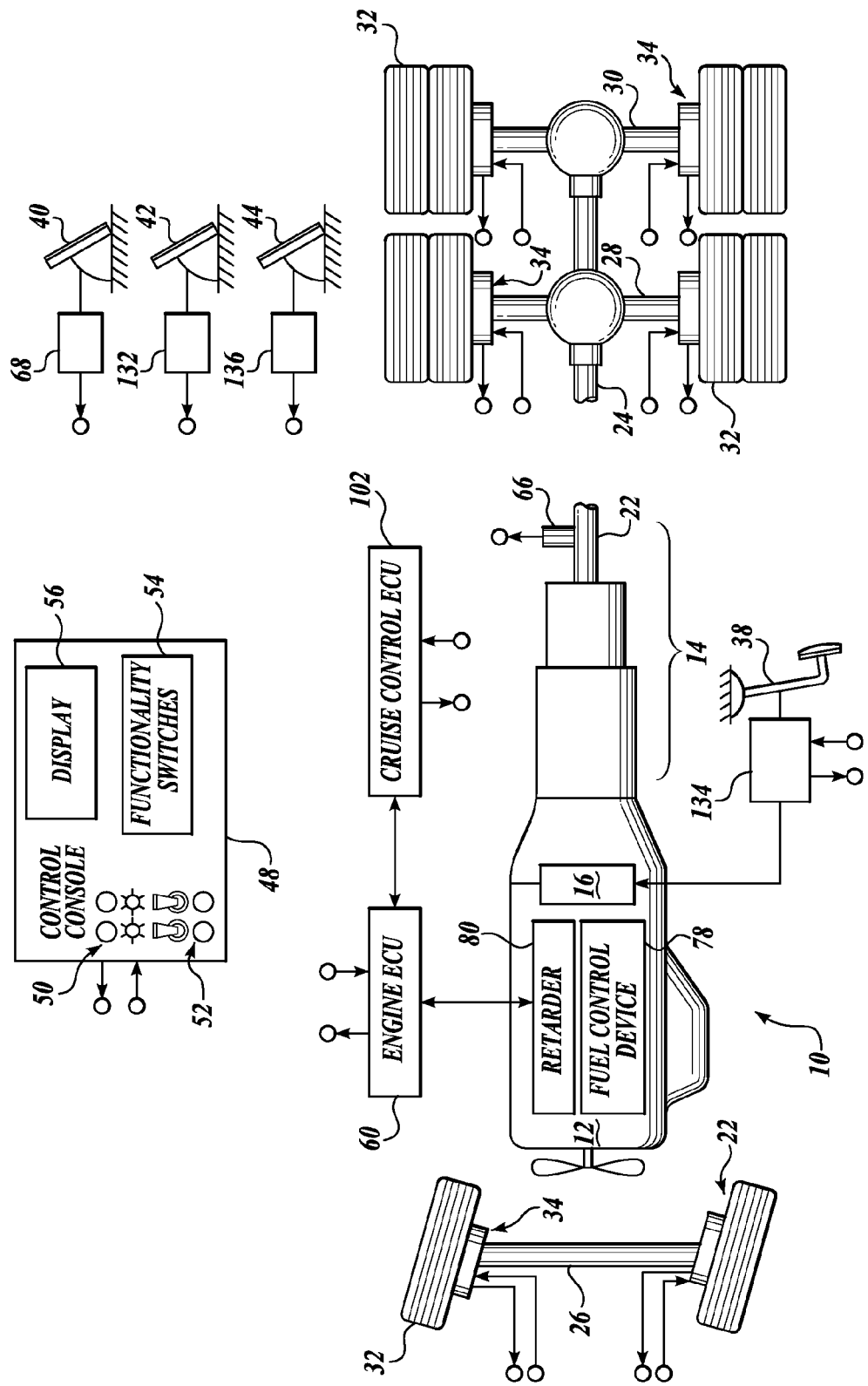
FIG. 2 is a schematic diagram of one suitable vehicle in which the cruise control system of FIG. 1 may be employed.
Figure 3:
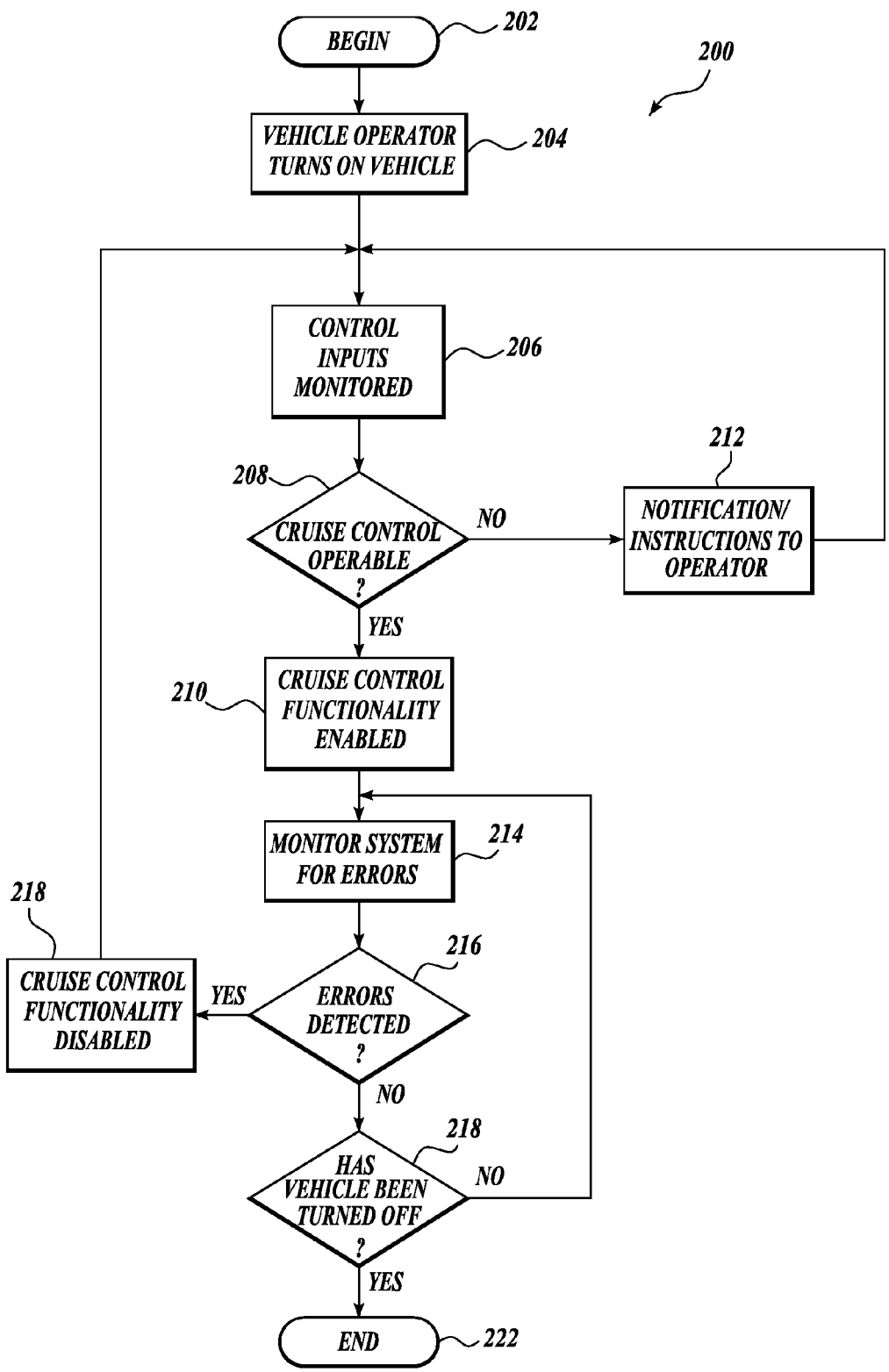
FIG. 3 is a flow diagram of one exemplary verification and/or notification method implemented by the cruise control system in accordance with aspect of the present invention.

As briefly described above, embodiments of the present invention are directed to cruise control systems suitable for use in a vehicle. One suitable vehicle in which the cruise control systems may be employed will now be described in more detail with reference to FIG. 2. As best shown in FIG. 2, a vehicle 10, such as a Class 8 tractor, having an electronically controlled engine 12 coupled to a transmission 14 via a clutch mechanism 16 is shown. Although a vehicle such as depicted in FIG. 2 represents one of the possible applications for the systems and methods of the present invention, it should be appreciated that aspects of the present invention transcend any particular type of vehicle employing an electronically or mechanically controlled internal combustion engine (e.g., gas, diesel, etc.), an electrically or mechanically controlled electric motor, or combinations thereof.

In the embodiment shown in FIG. 2, the transmission 14 may be a manual transmission, an automated manual transmission, or an automatic transmission that includes an output shaft 22 coupled to a vehicle drive shaft 24. The vehicle 10 includes at least two axles such as a steer axle 26 and at least one drive axle, such as axles 28 and 30. Each axle supports corresponding wheels 32 having service brake components 34. The service brake components 34 may include wheel speed sensors, electronically controlled pressure valves, and the like, to effect control of the vehicle braking system.

The vehicle 10 may also include conventional operator control inputs, such as a clutch pedal 38 (in some manual systems), an accelerator pedal 40, a service brake pedal 42, and a parking brake 44, and an operator interface, such as a control console 48, which may include any of a number of output devices 50, such as lights, graphical displays, buzzers, speakers, gages, and the like, and various input devices 52, such as toggle switches, push button switches, potentiometers, or the like. As will be described in more detail below, the output devices 50 may include a multi-functional display 56 mounted, for example, on the dashboard, and the input devices 52 may include one or more cruise control functionality switches 54, such as a cruise control on/off switch 122, a cruise control set switch 124, a cruise control resume switch 126, a cruise control coast switch 128, and a cruise control acceleration switch 130 (See FIG. 1). The functionality switches 54 can be positioned in any well known location, such as on the steering wheel, on the turn signal lever arm, and/or the dash.

The vehicle 10 is further equipped with a vehicle control system that controls several systems and subsystems of the vehicle. The vehicle control system may include an electrical control unit associated with the engine 12 ("engine ECU 60"). Generally described, the engine ECU 60 functions to manage various aspects of the operation of the engine 12. For example, the engine's ignition timing, fuel consumption, and the like, may be monitored and controlled by the engine ECU 60. To that end, the engine ECU receives signals from a variety of sensors, including wheel speed sensors (not shown) of the brake components 34, a vehicle speed sensor 66, an accelerator pedal position sensor 68, etc., and transmits a variety of control signals to devices including but not limited to fuel control devices 78 for selectively supplying fuel to the engine, an engine retarder 80, such as a jake brake, etc. The vehicle control system may include other control units, such as a transmission control unit, an ABS control unit, etc., as well known in the art.

It will be appreciated that the engine ECU 60 is configured to control the speed of engine 12 in response to commands received by the accelerator pedal position sensor 68 as a result of operator control of the accelerator pedal 40. As will be described in detail below, the engine ECU 60 is configured to control the speed of engine 12 in response to commands received from a cruise control ECU as a result of input signals from the cruise control functionality switches 54.

Figure 1:
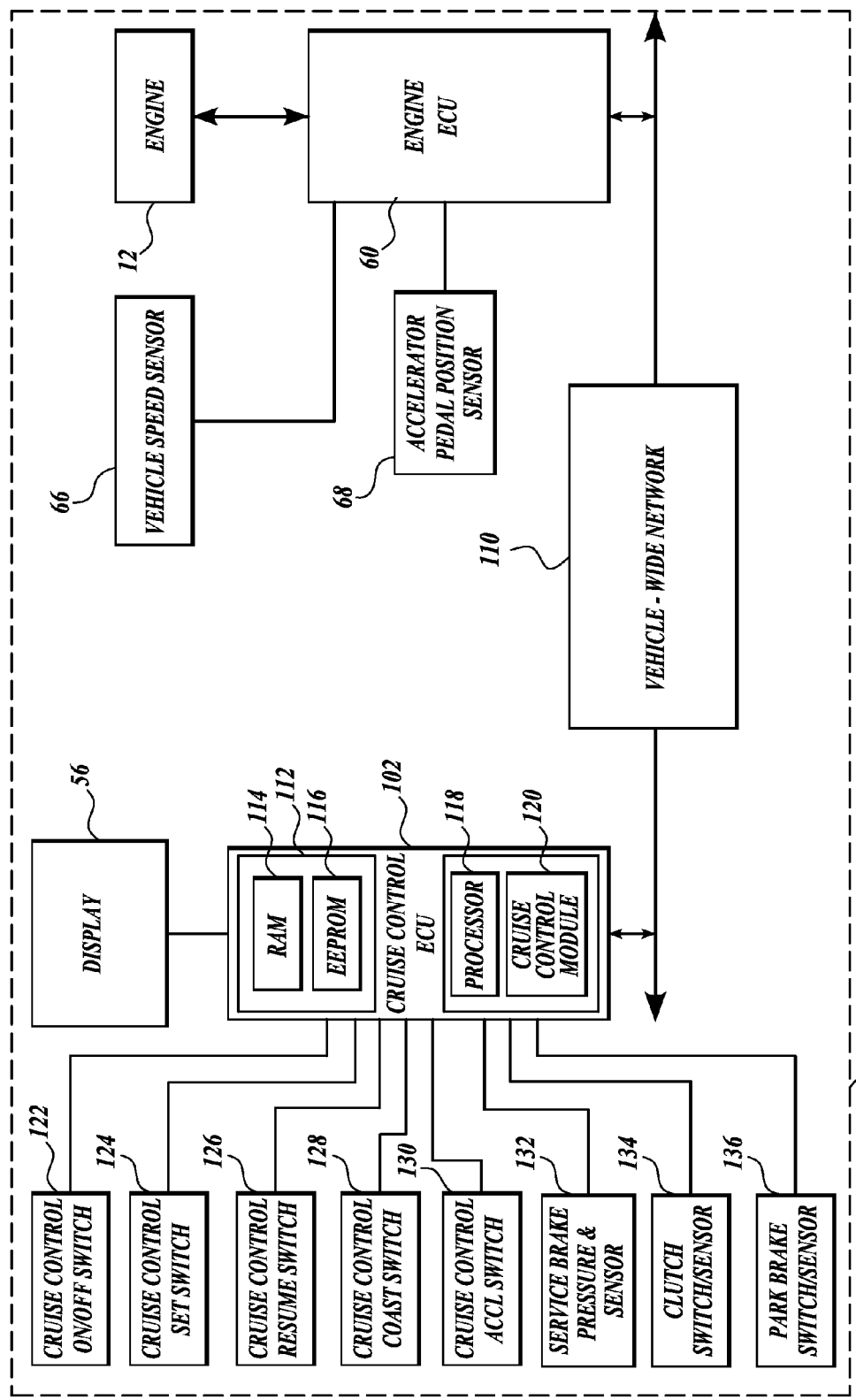
FIG. 1 is a functional block diagrammatic view of one embodiment of a cruise control system formed in accordance with aspects of the present invention.

Referring now to FIG. 1, there is shown a block diagrammatic view of one embodiment of a cruise control system, generally designated 100, formed in accordance with aspects of the present invention. The cruise control system 100 is suitable for use in a vehicle, such as the vehicle 10 described above, for controlling the speed thereof. As will be described in more detail below, the cruise control system 100 includes verification and/or notification features that: 1) verify the operational condition of the cruise control system 100; and 2) notify the operator of the operational condition of the system 100. In embodiments of the cruise control system 100, the system may also notify the operator as to whether certain operator actions may regain operability to the system 100.

As best shown in FIG. 1, the cruise control system 100 includes a cruise control electronic control unit 102 ("cruise control ECU 102") communicatively connected to the engine ECU 60 via an vehicle-wide network 110. Those skilled in the art and others will recognize that the vehicle-wide network 110 may be implemented using any number of different communication protocols such as, but not limited to, Society of Automotive Engineer's ("SAE") J1587, SAE J1922, SAE J1939, SAE J1708, and combinations thereof. However, embodiments of the present invention may be implemented using other types of currently existing, or yet to be developed, in-vehicle communication systems without departing from the scope of the claimed subject matter.

Generally described, the cruise control ECU 102 interfaces with the vehicle operator through various cruise control functionality switches 54 (See FIG. 1). To that end, the cruise control ECU is communicatively connected to the cruise control functionality switches, including a cruise control on/off switch 122, a cruise control set switch 124, a cruise control resume switch 126, a cruise control coast switch 128, and a cruise control acceleration switch 130, as best shown in FIG. 1. It will be appreciated that in some embodiments, the functionality of the set switch and the acceleration switch and/or the resume switch and the coast switch, respectively, can be implemented via a single switch and associated logic.

The cruise control ECU 102 may additionally be communicatively connected to a control input monitoring system comprised of one or more control input signal generators. The control input signal generators include but are not limited to a service brake pressure sensor 132, a clutch switch/sensor 134, and a parking brake switch/sensor 136. The service brake pressure sensor 132 is capable of generating signals indicative of the pressure level or pressure change in the vehicle brake hydraulic system, which in turn, indicates activation of the service brake pedal 42. The clutch switch/sensor 134 and the parking brake switch/sensor 136 are capable of generating signals indicative of the activation, e.g., press and release, of its associated pedal, lever, or like device. These switches/sensors may be any position switch or sensor that signals either absolute or relative position of the associated pedal or device, as known in the art. It will be appreciated that the switches/sensors may output their signals directly to the cruise control ECU 102, or may communicate with the cruise control ECU 102 via the network 110 (e.g., from engine ECU 60). While a service brake pressure sensor is employed in the exemplary embodiment, other embodiments may additionally or alternatively employ a brake pedal position switch/sensor (not shown).

It will be appreciated that the cruise control ECU 102 may communicate with other electronic components of the vehicle 10 over the vehicle-wide network 110. For example, data collected from other electronic components may be utilized by the cruise control ECU 102 and/or presented to the vehicle operator via one of the outputs 50, such as the display 56. Such data may be received from electronic components associated with vehicle subsystems, such as collision detection, engine operation, auxiliary power systems, and the like, and presented on the display 56. For example, the engine ECU 60 may monitor the speed of the engine 12 or the vehicle via engine, wheel and/or transmission sensors, including the vehicle speed sensor 66, and communicate such speeds to the cruise control ECU 102 via the vehicle-wide network 110, along with other engine operating parameters, such as oil pressure, coolant temperature, fuel consumption, etc, for display on the display 56 or through other outputs 50 of the control console 48.

It will be appreciated that the cruise control ECU 102 may be a separate controller dedicated to the cruise control system, or may be an existing on-board controller, such as the engine ECU 60, or a general purpose controller, such as a cab mounted controller, that controls multiple subsystems of the vehicle.

The engine ECU 60, the cruise control ECU 102, and any one of the various sensors, switches, actuators, etc., may contain logic rules implemented in a variety of combinations of hardware circuitry components and programmed microprocessors to effect control of the various vehicle systems and subsystems described herein. To that end, as further illustrated in FIG. 1, one suitable embodiment of the cruise control ECU 102 includes a memory 112 with a Random Access Memory ("RAM") 114, and an Electronically Erasable, Programmable, Read-Only Memory ("EEPROM") 116, a processor 118, and a cruise control module 120 for effecting verification and/or notification functionality to the cruise control system. The module 120 includes executable instructions that generate control signals operative to provide at least the following functions: 1) general cruise control functionality (e.g., on/off, set, acceleration, coast, resume, etc.); and 2) specific verification/notification functionality, as will be described in detail below.

Those skilled in the art and others will recognize that the EEPROM 116 is a non-volatile memory capable of storing data when a vehicle is not operating. Conversely, the RAM 114 is a volatile form of memory for storing program instructions that are accessible by the processor 118. Typically, a fetch and execute cycle in which instructions are sequentially "fetched" from the RAM 114 and executed by the processor 118 is performed. In this regard, the processor 118 is configured to operate in accordance with program instructions that are sequentially fetched from the RAM 114.

In accordance with aspects of the present invention, the verification and notification features described herein are implemented by the cruise control module 120. In this regard, the cruise control module 120 may be loaded from the EEPROM 116 into the RAM 114 at vehicle startup. After vehicle startup, the cruise control module 120 monitors one or more of the cruise control functionality switches 54 in order to control the speed of the vehicle.

Due to safety concerns associated with the potential for the cruise control system 100 to fail to disengage as a result of activation of a control input by the vehicle operator, for example, depressing the clutch pedal, depressing the brake pedal, etc., embodiments of the cruise control system 100 verify the operational condition of the control input monitoring system prior to enabling the general operations of the cruise control system. In one embodiment of the present invention, the cruise control system 100 verifies the operational condition of the control input monitoring system by performing functionality checks on, for example, the service brake pressure sensor 132, the clutch switch/sensor 134, and the parking brake switch/sensor 136.

For example, the cruise control system 100 keeps track of whether one or more signals have been generated by the clutch switch/sensor 134 within a preceding time period. In one embodiment, the cruise control system 100 keeps track of whether the clutch switch/sensor 134 has generated signals subsequent to the ignition key to the vehicle being turned to the "on" position. Likewise, the cruise control system 100 keeps track of whether one or more signals have been generated by the service brake pressure sensor 132 within a preceding time period. In one embodiment, the cruise control system 100 keeps track of whether the service brake pressure sensor 132 has generated signals subsequent to the ignition key to the vehicle being turned to the "on" position. In several embodiments, the cruise control system 100 keeps track of whether the service brake pressure of the service brake hydraulic system exceeds some minimum threshold level, such as 3 psi, during a proceeding time period so as to ignore insignificant smaller variations in service brake pressure that might occur absent some significant depressing of the service brake pedal. Such signals generated by the service brake pressure sensor 132 and/or the clutch switch/sensor 134 indicate that the functionality check is successful, that is, the switch/sensor is generating signals that are associated with control input activation.

Verification can occur at a predetermined time interval after vehicle start-up or as a result of vehicle operator input (e.g., depressing the cruise control on switch 122). Upon successful completion of the functionality checks conducted on the control input monitoring system, the cruise control system 100 enables general cruise control functionality (e.g., set speed, resume speed, coast, acceleration) for controlling the speed of the vehicle. In this manner, the cruise control system 100 monitors the signals generated by the cruise control functionality switches 54. In several embodiments of the present invention, the cruise control system 100 may then continuously monitor the control input monitoring system for errors, if desired.

In accordance with aspects of the present invention, if the cruise control system 100 determines that one or more of the functionality checks have failed, the cruise control system 100 becomes disabled. Once disabled, the cruise control system 100 notifies the vehicle operator. The vehicle operator can be notified visually through the display 56 or other vehicle displays, etc., audibly through vehicle speakers, etc. or via haptic feedback with associated devices. In accordance with further aspects of the present invention, the cruise control system 100 may issue instructions to the vehicle operator that can be implemented during vehicle operation, which may restore cruise control operability. These instructions may be visually displayed on the display 56, examples of which being shown in FIGS. 4 and 5, or audibly presented through speakers.

Referring now to FIG. 4, there is shown a flow diagram of one exemplary verification and/or notification method 200 in accordance with aspects of the present invention. Generally described, the method 200 verifies the operational condition of the cruise control system 100 and notifies the vehicle operator of its operating condition. In one embodiment of the method 200, the vehicle operator is notified and/or instructed as to whether any operator input could affect the operating condition of the cruise control system 100.

As shown in FIG. 4, the method begins at block 202, and at block 204, the vehicle operator turns the vehicle ignition to the "on" position. This, in turn, loads the cruise control module 120 into the RAM 114 from EEPROM 116. From block 204, the method continues to block 206, where the cruise control system 100 begins to monitor the control inputs, e.g. the service brake pedal 42, the clutch pedal 38, the parking brake 44, etc., for activation via the control input monitoring system. For example, in one embodiment, the control input monitoring system monitors any applicable control inputs, such as the clutch pedal 38 via the clutch switch 134 and the service brake pedal 42 via the service brake pressure sensor 132, for any activation subsequent to vehicle start-up. If the switches/sensors are functioning properly, any activation that has occurred subsequent to vehicle start-up causes the appropriate switch/sensor to generate signals that are stored in RAM 114.

Next, at decision block 208, a test is performed to determine the operational condition of the cruise control system 100, and in particular, the control input monitoring system. The test may be performed as a result of vehicle operator input, e.g., activating the cruise control on switch 122, or may be based on a predetermined time interval or intervals from vehicle start-up. In this regard, the cruise control ECU 102 processes any signals stored in RAM 114 to determine if the switches/sensors of the control input monitoring system are working properly.

For example, if any stored signals associated with the service brake pressure sensor 132 indicate that the pressure of the service brake hydraulic system has, for example, exceeded the minimum threshold pressure level, or changed from less than the minimum threshold pressure level, to equal to or greater than the minimum threshold pressure level, and back to less than the minimum threshold pressure level since vehicle start-up, then the service brake pressure sensor 132 will be deemed by the cruise control system 120 to have successfully passed its functionality check. Likewise, if stored signals associated with the clutch switch/sensor 134 have, for example, cycled from being closed, to open, and back to closed, at least once since vehicle start-up, then the clutch switch/sensor 134 will be deemed by the cruise control system 100 to have successfully passed its functionality check.

If it is decided at decision block 208 that all of the functionality checks have passed, the cruise control system 100 is deemed to be operational, and as a result, the method proceeds to block 210, where cruise control functionality is enabled. However, if it is determined at decision block 208 that one or more functionality checks have failed, then cruise control functionality is not enabled, and the method proceeds to block 212.

At block 212, the cruise control system 100 notifies the vehicle operator that the cruise control failed to be enabled. In this regard, the cruise control ECU 102 can generate suitable information and transmit such information to the appropriate outputs 50 to notify the operator that the cruise control system is not enabled. In one embodiment, the cruise control ECU 102 notifies the vehicle operator in response to the vehicle operators attempt to engage the cruise control by activation of, for example, the cruise control on switch 122. In will be appreciated that in some embodiments, the cruise control system 100 may lack a cruise control on switch 122, and thus, is engaged by activation of the cruise control set switch. Alternatively, the cruise control ECU 102 can notify the vehicle operator at any time subsequent to completion of the test at decision block 208.

The cruise control ECU 102 can notify the vehicle operator in a number of different methods. For example, if the vehicle is equipped with the display 56, the cruise control ECU 102 can display information on the display 56 that indicates non-enablement of the cruise control. In other examples, the cruise control ECU 102 can display information by energizing a red light associated with the cruise control on switch 122. Alternatively, the vehicle operator can be notified that the cruise control system 100 is not enabled audibly via speakers or by haptic feedback. If audibly, the notification can be a simple sound associated with nonenablement, or the notification can be speech that indicates nonenablement. If by haptic feedback, one or more cruise control functionality switches, the steering wheel, etc. can be configured to transmit haptic feedback to the vehicle operator. Other methods of notifying the vehicle operator are also complemented to be within the scope of the present invention, as claimed.

In embodiments where the display 56 is a multi-functional display (MFD), the cruise control ECU 102 can additionally or alternatively display a suitable notification message to the vehicle operator that vehicle operator input is needed to enable the cruise control system 100. For example, the notification message may instruct the vehicle operator to activate, e.g., press and release, a specified control input that is associated with a switch or sensor that has failed its functionality check so that cruise control functionality can be enabled. One such notification message is shown in FIG. 4. In response to such notification message, the vehicle operator can activate, e.g., press and release, the specified control input(s), thereby allowing the cruise control system to detect a change in state of the one or more sensors/switches of control input monitoring systems at block 206 if the control input monitoring system is functional. Once the cruise control system 100 has verified the functionality of the control input monitoring systems at decision block 208, the method 200 proceeds to block 210.

Referring now to FIGS. 4 and 5, examples are shown of notifications suitable for display to the operator of a vehicle at block 212. In the instance where there is a failure of the functionality check of the service brake pressure sensor 132, the example Brake Warning of FIG. 4 would be shown. In the instance where there is a failure of the functionality check of the clutch switch/sensor 134, the example Clutch Warning of FIG. 5 would be shown. In the case of both the functionality check of the service brake pressure sensor 132 and the clutch switch 134 failed, the Brake Warning would first be displayed, then once that is cleared the Clutch Warning would be displayed; alternatively the Clutch Warning would be the first to be displayed, then once that is cleared the Brake Warning would then be displayed. In other embodiments, a MFD capable of displaying two or more warnings at one time may be employed.

In some embodiments of the present invention, the method 200 ends after block 210. However, in the exemplary embodiment, the method 200 may optionally include additional steps as will be explained in more detail. Specifically, after the method 200 proceeds to block 210 and the cruise control system is enabled, the method may optionally proceed to block 214, where the cruise control ECU continues to monitor the control input monitoring system for errors. The method 200 then proceeds to decision block 216. At decision block 216, a test is performed to determine if an error in the control input monitoring system has been detected after enablement of the system 100. If errors are detected at decision block 216, the method 200 proceeds to block 218, where the cruise control system is disabled. From block 218, the method 200 returns to block 206. If errors are not detected at decision block 216, the method 200 proceeds to decision block 220. At decision block 220, a test is performed to determine if the vehicle has been turned off. If so, the method 200 ends at block 222. If not, the method 200 returns to block 214.

The principles, representative embodiments, and modes of operation of the present invention have been described in the foregoing description. However, aspects of the present invention which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present invention. Accordingly, it is expressly intended that all such variations, changes, and equivalents fall within the spirit and scope of the present invention, as claimed.

The invention claimed is:

1. A cruise control system for a vehicle, comprising:
    an output device operative to transmit information to a vehicle operator;
    one or more control inputs;
    one or more signal generators associated with the one or more control inputs and capable of generating signals indicative of the actuation of the one or more control inputs; and
    a controller configured to: 1) receive signals generated by the one or more signal generators; 2) stores said signals generated by the one or more signal generators; 3) determine cruise control system inoperability or cruise control system operability based on said stored signals; 4) in response to a determination of cruise control system inoperability, generate cruise control inoperability information for output by the output device for notifying the vehicle operator of cruise control system inoperability, the cruise control system inoperability caused by at least one signal generator of the one or more signal generators; and 5) generate signals for output by the output device as instructions for the vehicle operator to activate the at least one control input associated with cruise control system inoperability in an attempt to restore cruise control system operability.

2. The cruise control system of claim 1, wherein the output device transmits audible or visual information to the vehicle operator.

3. The cruise control system of claim 1, wherein the output device is a display for visually displaying information generated by the controller.

4. The cruise control system of claim 1, wherein the control input is selected from a group consisting of a service brake pedal, a clutch pedal, and a parking brake.

5. The cruise control system of claim 1, wherein the controller determines cruise control system inoperability upon vehicle operator input.

6. The cruise control system of claim 5, wherein the vehicle operator input is activation of one or more cruise control functionality switches.

7. The cruise control system of claim 1, wherein the controller determines the cruise control system inoperability at a predetermined time period after vehicle start-up.

8. The cruise control system of claim 1, wherein the output device is a display, and wherein the instructions outputted by the output device are displayed on the display.

9. The cruise control system of claim 1, wherein the one or more signal generators are selected from a group consisting of a service brake pressure sensor, a service brake pedal position switch, a clutch pedal position sensor, a clutch pedal position switch, a parking brake position sensor, and a parking brake position switch.

10. The cruise control system of claim 1, wherein the one or more signal generators consisting of a service brake pedal position sensor.

11. A vehicle cruise control system capable of controlling the operation of a vehicle engine, comprising:
    an output device operative to transmit information to a vehicle operator;
    one or more control inputs;
    a cruise control monitoring system for monitoring the activation of the one or more control inputs, the cruise control monitoring system including one or more signal generators associated with the one or more control inputs and capable of generating signals indicative of the actuation of the one or more control inputs; and
    a control unit configured and arranged to enable control of the vehicle engine and disable control of the vehicle engine, wherein prior to vehicle engine control enablement, the control unit: 1) receives signals generated by the cruise control monitoring system; 2) stores said signals generated by the cruise control monitoring system; 3) determines if the cruise control system is operable by conducting functionality checks for each of the one or more signal generators based on said stored signals; 4) in response to a determination of cruise control system inoperability, notifies the vehicle operator of non-enablement of vehicle engine control, the cruise control system inoperability caused by one or more failed functionality checks of the one or more signal generators; 5) instructs the vehicle operator via the output device to activate the one or more control inputs associated with the failed functionality checks, and 6) verifies the operability of the cruise control monitoring system upon activation by the vehicle operator of the one or more control inputs associated with the failed functionality checks.

* * * * *